United States Patent
Marshall et al.

(10) Patent No.: US 9,712,509 B1
(45) Date of Patent: Jul. 18, 2017

(54) PRODUCT AND COVERAGE REVIEW AND RECOMMENDATION

(75) Inventors: Pamela M. Marshall, Lake Zurich, IL (US); Dawn Desser Stanicek, Northbrook, IL (US)

(73) Assignee: ALLSTATE INSURANCE COMPANY, Northbrook, IL (US)

(*) Notice: Subject to any disclaimer, the term of this patent is extended or adjusted under 35 U.S.C. 154(b) by 699 days.

(21) Appl. No.: 13/277,422

(22) Filed: Oct. 20, 2011

(51) Int. Cl.
*G06Q 30/06* (2012.01)
*H04L 29/06* (2006.01)
*G06Q 30/08* (2012.01)

(52) U.S. Cl.
CPC .................. *H04L 63/08* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

| | | | |
|---|---|---|---|
| 6,012,043 A | 1/2000 | Albright et al. | |
| 7,356,497 B1 | 4/2008 | Bursey et al. | |
| 7,552,079 B2 | 6/2009 | Bove et al. | |
| 7,574,392 B2 | 8/2009 | Schaub | |
| 7,809,625 B1 | 10/2010 | Thurmond et al. | |
| 7,917,530 B1 | 3/2011 | Eubank et al. | |
| 2002/0194094 A1 | 12/2002 | Lancaster et al. | |
| 2002/0194120 A1 | 12/2002 | Russell et al. | |
| 2003/0182290 A1* | 9/2003 | Parker ........................... | 707/100 |
| 2003/0208427 A1 | 11/2003 | Peters et al. | |
| 2004/0039701 A1* | 2/2004 | Nakamura et al. ............. | 705/42 |
| 2006/0015423 A1 | 1/2006 | Ballenger | |
| 2006/0020538 A1 | 1/2006 | Ram et al. | |
| 2007/0271166 A1 | 11/2007 | Boone et al. | |
| 2008/0114620 A1 | 5/2008 | Donnelli | |
| 2010/0211403 A1 | 8/2010 | Allsup et al. | |

(Continued)

FOREIGN PATENT DOCUMENTS

WO 2008046157 A1 4/2008

OTHER PUBLICATIONS

US Constitution, Article I, Section 8, Clause 7, Postal Clause or the Postal Power, empowers Congress "To establish Post Offices and post Roads".*

(Continued)

*Primary Examiner* — James Zurita
(74) *Attorney, Agent, or Firm* — Banner & Witcoff, Ltd.

(57) ABSTRACT

Financial security and coverage may be reviewed at a comprehensive level by evaluating an ownership status of an entity relative to multiple types of financial products. Based on results of the review, recommendations for one or more financial products may be provided. Additionally or alternatively, the recommendations and products may be ranked or prioritized. According to another aspect, the review of the entity's financial security and coverage may be represented graphically. For example, types of financial products may be represented by icons (e.g., pictograms) with various visual attributes (e.g., color, transparency, pattern, size, etc.) indicating the entity's ownership status. Potential gaps in the entity's financial coverage may be represented with a specified visual element such as a warning symbol or the like. The graphical depiction may allow an entity to better appreciate the spectrum of available financial product types and potential risks in the entity's current financial coverage profile.

20 Claims, 11 Drawing Sheets

(56) References Cited

U.S. PATENT DOCUMENTS

2010/0211528 A1* 8/2010 Loeper .................... 705/36 R
2010/0250419 A1 9/2010 Ariff et al.
2011/0040581 A1 2/2011 Wirth

OTHER PUBLICATIONS

Fort Point Insurance, "Fort Point Coverage Review Questionnaire", downloaded on Apr. 26, 2011 from http://www.fpins.com/coverage_review_questionaire.html, 2 pages.
IRMI.com, "Plugging Liability Insurance Gaps with the Personal Umbrella Policy", Feb. 2005, downloaded on Apr. 26, 2011 from http://www.irmi.com/expert/articles/2005/hungelmann02.aspx, 6 pages.
"Virtual Risk Consultant", downloaded on Apr. 26, 2011 from http://www.iiaba.net/NV/05_MemberProductsServices/04_MemberServices/NAV_MPSMemberServices?ContentPreference=NV&ActiveState=NV&ActiveTab=NA&ContentLevel1=MEMPROD&ContentLevel2=MPSSERV, 3 pages.
Oberlander Dorfman, Inc., "Health Insurance", downloaded on Apr. 26, 2011 from http://www.thebestga.com/ucHealth.html, 3 pages.
Kenneth Cline, "Banking Strategies", Chicago, IL, Nov./Dec. 1999, vol. 75, Iss. 6, p. 54, 5 pages.
Westfield Insurance, "Coverage Detective", downloaded on Apr. 26, 2011 from http://www.westfieldinsurance.com/detective/coverage_detective.jsp, 1 page.
The Rough Notes Company, Inc. "How are over 2,000 agencies using The Rough Notes Agency Online?", downloaded on Apr. 26, 2011 from http://www.roughnotes.com/agencyonline.htm, 2 pages.
Mar. 9, 2017—(US) Non-Final Office Action—U.S. Appl. No. 14/081,257.

* cited by examiner

| PRIORITY | CONDITION 1 | CONDITION 2 | Then Recommend |
|---|---|---|---|
| 1 | Auto (Blue) | Home, Condo, or Renters (Green, white) | Home |
| 2 | Home or Condo or Renters (Blue) | Auto (Green, white) | Auto |
| 3 | Auto (White or Green) | Home, Condo, or Renters (Green, white) | Home Auto |
| 4 | Auto (White or Green) | NO Home, Condo, and Renters (all in AP) | Auto |
| 5 | Home, Condo, or Renters (White or Green) | NO Auto (in AP) | Home, Condo, or Renters (recommend any that are white or green) |
| 6 | Life (white) | | Life |
| 7 | Personal Umbrella Policy (PUP) (white) | Home, Condo, or Renters (Blue, Green or White) | PUP |
| 8 | Motorcycle (white) | | Motorcycle |
| 9 | Boat (white) | | Boat |
| 10 | All-Terrain Vehicle (ATV) (white) | | ATV |
| 11 | Motor Home (white) | | Motor Home |
| 12 | Snowmobile (white) | | Snowmobile |
| 13 | Roadside (white) | Auto (Blue, Green or White) | Roadside |
| 14 | Scheduled Personal Property (SPP) (white) | | SPP |
| 15 | ID Restoration (white) | | IDR |
| 16 | Flood (white) | | Flood |
| 17 | Retirement (white) | | Retirement |
| 18 | Education (white) | | Education |
| 19 | Business (white) | | Business |
| 20 | Landlord's Package Policy (LPP) (white) | | LPP |
| 21... | Repeat lines 6-20 in order by product for Green icons, i.e. Green Life, PUP, Motorcycle, Boat... | | Same as Green Icon, i.e. Life, PUP, Motorcycle, Boat, etc. |

FIG. 6

What's Next?

800

Company X offers products and policies to fill any potential gaps in your coverage. For more details on each policy, click the product page link.

Personal Umbrella Policy (PUP)

With the rising costs of medical care today, what you'd have to pay if you injured someone in a car accident could easily go beyond what your auto policy limits cover. If you don't have enough coverage, you can potentially lose your home or even have your wages garnished. Don't put your lifestyle at risk.

> View Product Page

Roadside

If you're on a family road trip and something happens to your car, the extra costs of food, lodging and other travel arrangements could easily eat up your vacation budget. With roadside assistance, we'll reimburse you up to $1,500 and help you get back on the road fast. Keep your vacation stress-free.

> View Product Page

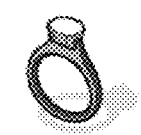

Scheduled Personal Property (SPP)

If the diamond falls out of your engagement ring, it's likely not fully covered under your property insurance. That's why many people choose the extra protection of Additional Valuables Coverage (SPP). Don't take chances with your valuables.

> View Product Page

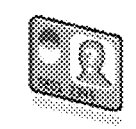

Identity Restoration

Someone's identity is stolen every 3 seconds,* and it can take years to repair the damages. If your identity is stolen, Identity Theft Restoration Coverage can take care of the expenses and legal work necessary to restore your credit rating. Don't leave your credit rating to chance.

*Javelin Strategy & Research, 2009 Identity Fraud Survey Report.

> View Product Page

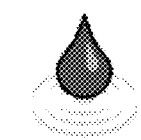

Flood

In the U.S., the average flood insurance claim paid is more than $45,000 per year, and about 25% of those claims come from low- to moderate-risk areas.* Even if you don't think you're at risk, a flood policy can help complete your property's insurance protection. Don't leave your property at risk.

*National Flood Insurance Statistics, 1999-2008

> View Product Page

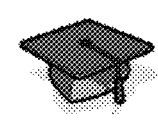

Education

When you factor in tuition, room/board and other college fees, the average four-year public school can be almost $13,000 per year,* and the average four-year private university can be more than $30,000 per year.* Are you planning ahead for your children? Even if they're still in diapers, we can help you start an education savings account. Don't wait until later to start saving.

*College Board: Trends in College Pricing, 2009

> View Product Page

PRODUCT AND COVERAGE REVIEW AND RECOMMENDATION

TECHNICAL FIELD

Aspects of the disclosure relate to reviewing an individual or entity's product coverage. In particular, aspects are directed to providing a summary of an individual or entity's product coverage and generating recommendations, when appropriate.

BACKGROUND

Financial security is a universally shared goal. People seek financial security in a variety of ways including purchasing insurance, saving money for retirement, saving money for children's education and the like. However, individuals and other entities might not be aware of all of the various financial coverage products (e.g., insurance products, roadside assistance, etc.) available to them or facets of life that may be impacted by financial concerns. Additionally, the individuals or entities might also be unaware as to the relative importance of various financial protections.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6 illustrates an example decision matrix for generating recommendations based on an entity's financial coverage profile according to one or more aspects described herein.

FIG. 8 illustrates an example recommendations interface according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

One or more aspects described herein provide individuals and other entities with a financial summary and overview to help identify potential gaps in financial protection and/or opportunities for discounts. Systems, apparatuses, methods and computer-readable media described herein offer the user a comprehensive overview of their current financial coverage profile along with one or more recommendations for improving their financial security. The recommendations may be specific to the reviewed individual or entity and may be ranked to help the reviewed party prioritize their actions and financial security plans (e.g., determining which financial product to purchase first).

In one or more arrangements, a financial product and coverage overview may be provided using graphical icons and other visual elements. The arrangement and visual characteristics of the graphical elements in the interface may provide significance to the various displayed products and information. For example, different colors may indicate different statuses while different regions of the interface may be dedicated to products of different levels of importance or significance. The visual displays may be customized (e.g., personalized) for each individual or entity for which financial coverage is reviewed.

Other features and advantages of the disclosure will be apparent from the additional description provided herein.

Figure 1:
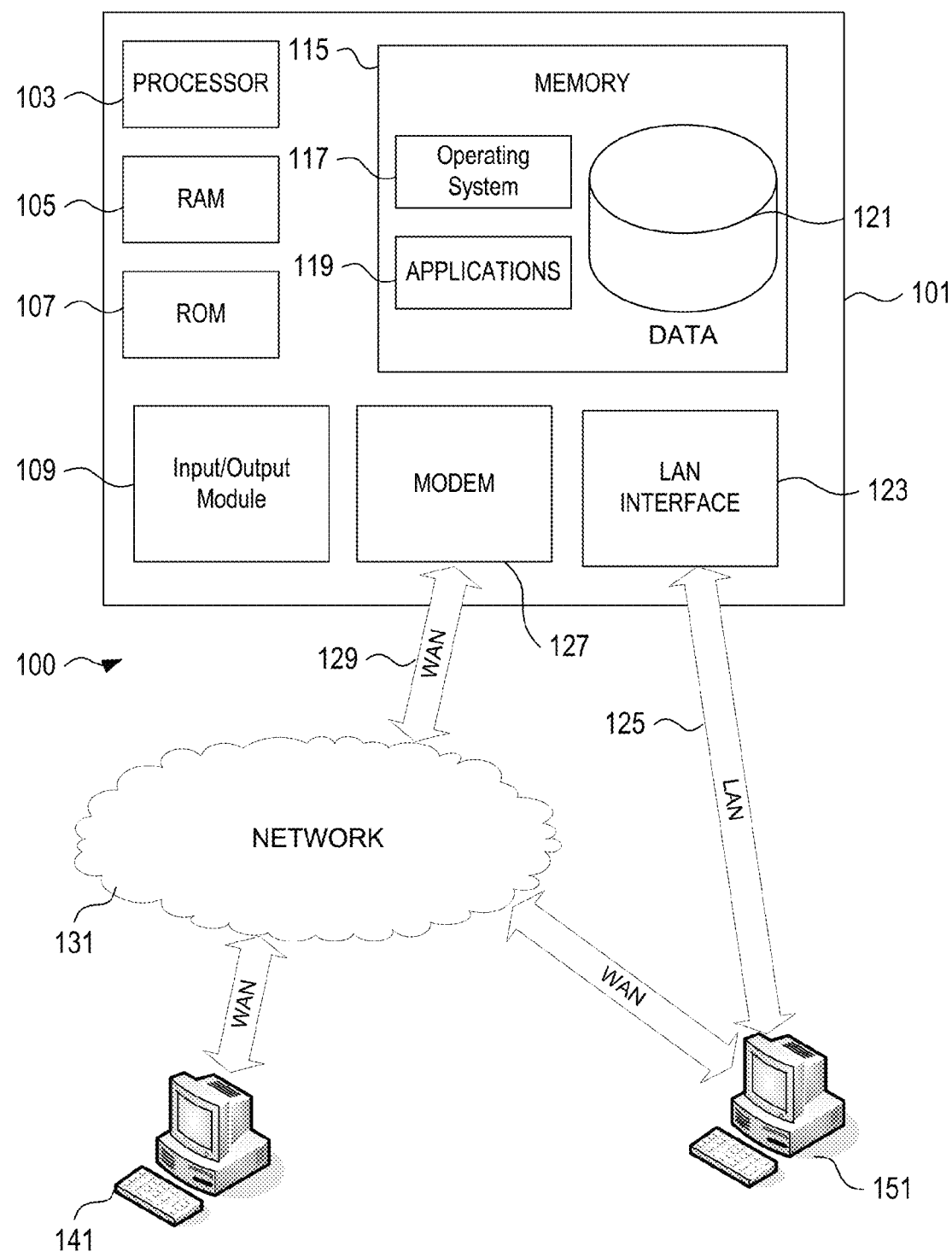
FIG. 1 illustrates a network environment and computing systems that may be used to implement aspects of the disclosure.

FIG. 1 illustrates a block diagram of a product review and recommendation system 101 (e.g., an insurance coverage review and recommendation server) in communication system 100 that may be used according to one or more illustrative embodiments of the disclosure. The product review and recommendation system 101 may have a processor 103 for controlling overall operation of the product review and recommendation system 101 and its associated components, including RAM 105, ROM 107, input/output module 109, and memory 115.

Input/Output (I/O) 109 may include a microphone, keypad, touch screen, and/or stylus through which a user of product review and recommendation system 101 may provide input, and may also include one or more of a speaker for providing audio output and a video display device for providing textual, audiovisual and/or graphical output. Software may be stored within memory 115 and/or storage to provide instructions to processor 103 for enabling system 101 to perform various functions. For example, memory 115 may store software used by the device 101, such as an operating system 117, application programs 119, and an associated internal database 121. Processor 103 and its associated components may allow product review and recommendation system 101 to execute a series of computer-readable instructions to generate a payment factor schedule for an insurance product and to determine a payment amount based on the differing payment factors in the schedule.

The product review and recommendation system 101 may operate in a networked environment supporting connections to one or more remote computers, such as terminals 141 and 151. The terminals 141 and 151 may be personal computers or servers that include many or all of the elements described above relative to product review and recommendation system 101. The network connections depicted in FIG. 1 include a local area network (LAN) 125 and a wide area network (WAN) 129, but may also include other networks. When used in a LAN networking environment, the product review and recommendation system 101 is connected to the LAN 125 through a network interface or adapter 123. When used in a WAN networking environment, the product review and recommendation system 101 may include a modem 127 or other means for establishing communications over the WAN 129, such as network 131 (e.g., the Internet). It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the product review and recommendation system 101 according to an illustrative embodiment of the disclosure may include computer executable instructions for invoking functionality related to reviewing products purchased by a customer, identifying unpurchased products (e.g., gaps in insurance coverage) and providing recommendations for products or actions.

Figure 2:
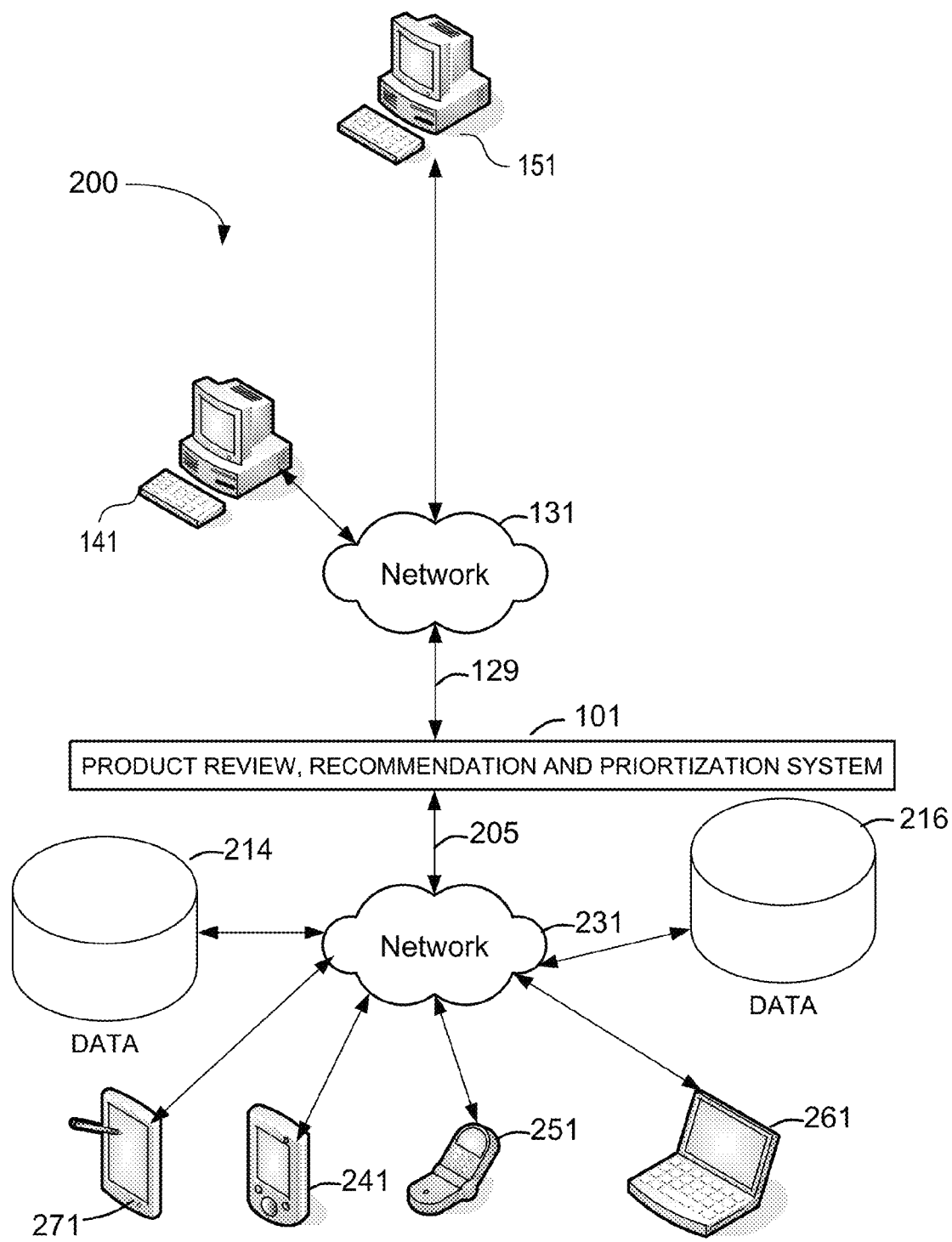
FIG. 2 illustrates an example operating environment according to one or more aspects of the disclosure.

Referring to FIG. 2, an example of a suitable operating environment in which various aspects of the disclosure may be implemented is shown in the schematic diagram. The computing system 200 is illustrated in one example of a suitable operating environment and is not intended to suggest any limitation as to the scope of use or functionality of the computing system 200. Computing system 200 may also include mobile terminals or phones such as 241 and 25, laptops such as laptop 261 and/or tablet computers such as tablet 271 for use in communication with product review and recommendation system 101 through network 231.

The computing system 200 may also be comprised of one or more databases 214, 216 coupled to a product review and recommendation system 101. The communication between the databases 214, 216 and the product review and recommendation system 101 may be through wired or wireless communication networks (depicted by network cloud 231). The product review and recommendation system 101 and other devices (e.g., databases 214, 216) may be connected to one or more of the networks via twisted pair wires, coaxial cable, fiber optics, satellite signals, radio waves or other media. The term "network" as used herein and depicted in the drawings should be broadly interpreted to include not only systems in which remote databases are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

The plurality of databases 214, 216 may include information belonging to or maintained by an insurance provider/company, government entity, and/or third-party entity. For privacy protection reasons, access to the information in these databases 214, 216 may be restricted to only authorized computing devices and/or users and for only permissible purposes. For example, a database 214 may comprise a computer internal to an insurance company and may store customer policy information. The stored policy information about a customer may include, but is not limited to, the customer's relevant coverage limits/deductibles with insurance carriers, the customer's address information and other personal information, and any other information apparent to one skilled in the art.

In another example, database 214 may also store predefined business rules and other information to enable the methods, systems and applications disclosed herein. For example, the database 214 may store historical policy data (e.g., insurance products purchased, renewed, not renewed, coverage levels, changes in coverage levels, etc.) or other applicable data archived by the insurance company. This data may be used, among other things, to optimize the business rules, to evaluate product needs and gaps and/or recommend and prioritize products, coverages and/or actions as used in the method and systems disclosed herein.

System 200 may further include one or more other databases such as database 216 storing the same or different types of information. For example, database 216 may correspond to an external database of a third party (e.g., another insurance provider, a government database, private or public data warehouses, etc.). Either database 214 or database 216, or both, may store a variety of other types of information including demographic data, personal contact information, product information of competitors or other companies and the like.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

A product review and recommendation system such as system 101 of FIGS. 1 and 2 may be configured to obtain existing insurance coverage information for an individual or entity (e.g., family, company, organizations, etc.), identify potential gaps in the insurance coverage of the individual entity, recommend products or actions to address those gaps and prioritize those actions or products. Accordingly, system 101 may provide a comprehensive overview and review of an individual or entity's existing insurance coverage and potential insurance needs. For example, if an individual owns auto insurance and home owner's insurance but not life insurance, the system 101 may recommend adding life insurance and/or flood insurance. The system 101 may also prioritize the recommended products and actions in the event the individual is only able to add fewer than all of the recommended products or to take fewer than all recommended actions. The recommendations and review are not limited to insurance products and may include savings, retirement funds, identity theft protection, roadside assistance, education savings and/or other products related to financial security and safety. The comprehensive overview allows the individual or entity to better understand and appreciate the available financial products and the individual's or entity's level or sufficiency of coverage in view of those products.

Figure 3:
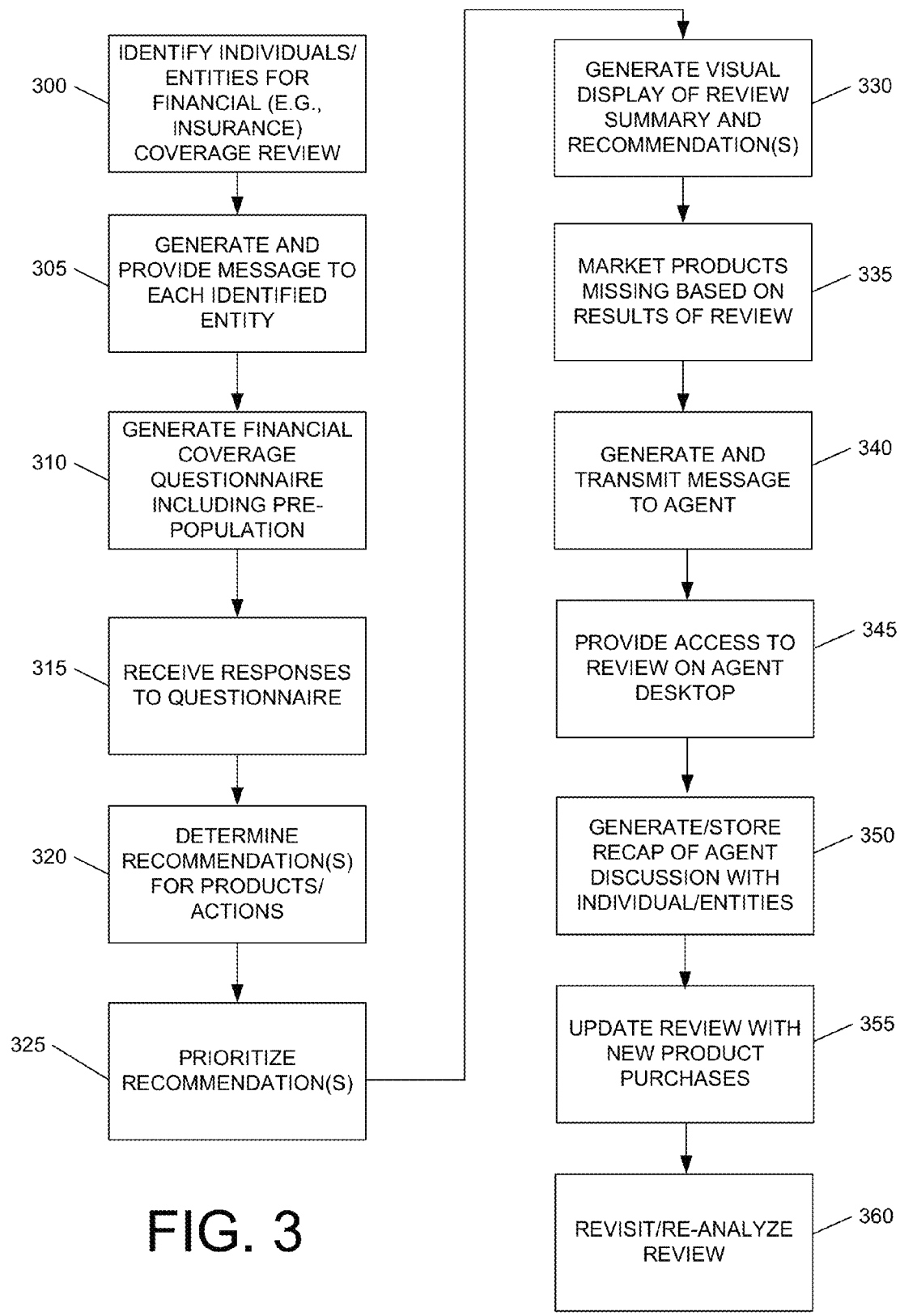
FIG. 3 is a flowchart illustrating an example method for reviewing an entity's financial coverage and generating recommendations relating thereto according to one or more aspects of the disclosure.

FIG. 3 illustrates an example process by which a user's financial coverage may be reviewed and recommendations provided. In step 300, a coverage review system such as product review and recommendation system 101 (FIG. 1) may identify one or more individuals for which a financial coverage review is to be initiated. Financial coverage may include savings, retirement, insurance, roadside assistance and the like. The identification of individuals or entities may be based on an amount of time since a last review, a type of coverage or financial product that is missing from the individual or entity's portfolio, the individual or entity's lifestyle or line of work/business, whether the individual or entity is a current customer of at least one, two, five, ten, etc. of a company's financial products, whether the customer has recently (e.g., within a specified time frame) contacted the company or an agent of the company or purchased a new financial product and the like. In other examples, the identification of individual or entities may be based on whether the individual or entity would benefit from savings by switching to a product provided by the reviewing company, by adding or purchasing a product, and the like. In some arrangements, the system may initiate the review for all current customers on a predefined schedule (e.g., every year, every 6 months, every month, every 3 months, every 2 years, etc.).

Upon identifying individuals and/or entities for which a financial coverage review is to be conducted, the system may subsequently generate and provide a message to each of the identified entities in step 305. The message may include an electronic message such as an e-mail, a text message, a multimedia message and the like and/or a physical message such as a letter sent through postal mail, a voice message and the like. In one or more arrangements, the message may include a link to a questionnaire site where the entity is invited to complete questions regarding their existing financial coverages. Alternatively or additionally, the financial coverage questionnaire may be included in an application or may be in hardcopy form (e.g., in a letter). In yet another or additional arrangement, the entity to be reviewed may be called by a telephone or other voice-based survey system. In yet another example the message may correspond to an electronic link on a website or other network page. In a particular example, the user may be invited to perform a review through a message or an interactive option (e.g., a link) in a My Account page of the reviewing company's website. The user may be required to login to the reviewing company's website in order to view and interact with such options and messages. In some arrangements, access or invitations to the review/questionnaire may be provided through multiple channels simultaneously or in some sequence. For example, an individual or entity may be able to access a questionnaire through an email invitation or through the individuals' account page on the company's website.

Prior to, in conjunction with or after sending the message, the system may further generate, in step 310, the financial coverage questionnaire or survey to be completed by the recipient entity. In one example, generating the questionnaire may include querying one or more databases to identify current coverages of the entity. Accordingly, the questionnaire may be specific to and customized for the particular entity by automatically pre-populating known or identified coverages for confirmation. The questionnaire may include a request for the entity to correct any errors in the pre-populated coverages. Generating the questionnaire may further include adding identifying information of the individual or entity for which the review is being undertaken. In some arrangements, the questionnaire may be generated on-demand and/or in real-time in response to the entity activating the questionnaire application or navigating to the questionnaire link provided in the message. For example, if an entity attempts to navigate to a website hosting the questionnaire, the system may receive and/or otherwise detect a request to access the questionnaire.

In step 315, the system may receive responses to the questionnaire. For example, responses may be sent electronically from the website (e.g., page-by-page, question-by-question, or as a whole after completion of the entire questionnaire) or from an application through which the questionnaire was completed. In another example, responses may be scanned in or manually entered from a physical questionnaire completed by the entity. In step 320, the system may determine one or more recommendations for the entity by comparing the received set of responses with one or more product and/or action recommendation rules. In one example, the product and/or action recommendation rules may prescribe products or actions based on the types and level of financial coverages already owned by the entity and type of financial coverages not yet owned by the entity. Such rules are described in further detail below.

In some configurations, the system may detect or otherwise determine a status of the questionnaire completion. For example, the system may detect whether questions remain unanswered from a website questionnaire. In another example, the downloadable or local application executing on the entity's computing device may send an electronic status message to the review and recommendation system. The status message may indicate a current progress (e.g., 10 of 25 questions answered), identification of questions answered, identification of questions not answered, an amount of time elapsed since the entity began answering questions or activated the application and the like.

In step 325, the system may subsequently prioritize the one or more recommendations based on prioritization rules. The prioritization rules may include specifying that life insurance is a higher priority than rental insurance or specifying that roadside assistance coverage is a higher priority than increasing savings. Alternatively or additionally, priorities may change depending on the types and/or levels of coverages that the entity owns or does not own. For example, if an entity owns auto insurance and home owner's insurance, but both are with another provider, then an auto insurance product provided by the reviewing company may be recommended with a higher priority. If, on the other hand, the entity owns auto insurance (still through another provider) but no home owner's insurance, then home owner's insurance may be recommended with higher priority. Further description regarding recommendations and recommendation prioritizations is provided below.

According to one or more aspects, the recommendation and prioritization rules may be selected based on one or more attributes of the entity. For example, different recommendation and prioritization rules may apply depending on an age of the entity or a gender of the individual. In another example, different rules may be used based on a geographic location in which the entity resides or works. Combinations of attributes may also be used to select an appropriate set of recommendation and prioritization rules.

In step 330, the system may generate a displayable interface including a summary of the entity's financial coverages and the one or more recommendations for improving the entity's financial coverage profile. In one example, financial products and coverages provided by a first company (e.g., the company providing the review) may be displayed in a first color while financial products or coverages currently provided by a second company (e.g., other than the review company) may be displayed in a second color. Financial products and/or coverages not purchased by the entity may be displayed in a third color. In addition to or as an alternative to differing colors, the financial products and/or coverages may differ in other visual attributes such as patterns, size, shape, transparency, text style/size, color gradients and the like. In a particular example, the system may retrieve or generate an icon for each of the financial products and/or coverages that are available or relevant to an entity (e.g., if an individual does not have a boat, boat insurance might not be retrieved or displayed). The icon for a financial product or coverage may exist in a database, for example, in multiple different colors or visual appearances. Accordingly, the appropriate icon (e.g., visual appearance) may be selected based on various attributes of the financial product or coverage such as the provider and/or whether the entity owns that type of financial product as described above. Other types of information may also be included in the displayable interface including a list of the determined recommendations.

According to some arrangements, the user interface and review summary might only be generated upon completion of the questionnaire. Thus, the system may save an entity's progress in completing the questionnaire if the entity leaves the questionnaire prior to completion and/or requests saving their progress. If an entity has started, but has not finished, the questionnaire, a reminder may be automatically generated and sent by the system.

In step 335, the system may further advertise, market or otherwise publicize various products of the reviewing company. These products may correspond to the gaps in coverage identified through the review. For example, if an individual does not have auto insurance or has auto insurance through another company, the system may advertise (e.g., send e-mails, display information on the review site, ask an agent to provide additional information) that particular product. A gap, in some arrangements, may correspond to an individual or entity not having a particular financial product, not having a particular financial product through a specific company and/or a combination thereof. Identifying gaps or recommendations are further described herein.

Additionally, the system may, in step 340, transmit a message to an agent to indicate that the individual has completed the questionnaire. The message may include a link to the summary so that the agent may independently review the information. The message may further provide instructions and information for contacting the reviewed entity. For example, the company may instruct the agent to contact the entity within the next 2 weeks and provide an e-mail address and a telephone number. In another example, the message may include talking points or a script for discussing one or more financial products with the entity. In a particular instance, the talking points or script may be specific to each type of product. In some instances, the message might only be generated and sent to an agent if there is an opportunity for the reviewed entity to receive a discount or if some other predefined condition is satisfied. Examples of predefined conditions may include the existence of at least one gap in the individual's coverage profile, one or more particular types of coverages lacking in the individual's coverage profile, and an amount of time the individual spent reviewing the summary. Alternatively, the message might always be generated and sent to an agent.

In some arrangements, the system may also provide access to the review through an agent's desktop in step 345. In a particular example, an agent may execute an application configured to interface with the review system or another system of the reviewing company. Accordingly, when a review becomes available, the agent may receive access capabilities through the application to review and update the summary (including gaps and recommendations) and contact the individual or entity as needed.

The system may also record or store an agent's discussion with the reviewed individual or entity in step 350. In one example, the agent may enter notes or audibly and/or visually record his or her discussion. The discussion notes, audio and/or video may then be received by the system for storage and future access/retrieval and review. In a particular example, the agent may be required to complete a questionnaire after a discussion with the reviewed individual or entity. Notes of the agent's discussion may then be generated based on the agent's responses to the questionnaire. Additionally, in step 355, upon becoming aware of a new product purchase by the individual, the system may automatically update the individual's coverage summary. The system may also conduct automatic reviews or request updated information for reviewed individuals or entities in step 360. The system may revisit reviews every year, every month, every 3 months or based on some other schedule (periodic or aperiodic).

The above process of FIG. 3 provides individuals and entities with a consistent and measurable protection review process. Thus, individuals and entities may be assured that the reviewing company is monitoring their financial coverage and the sufficiency thereof.

Figure 4:
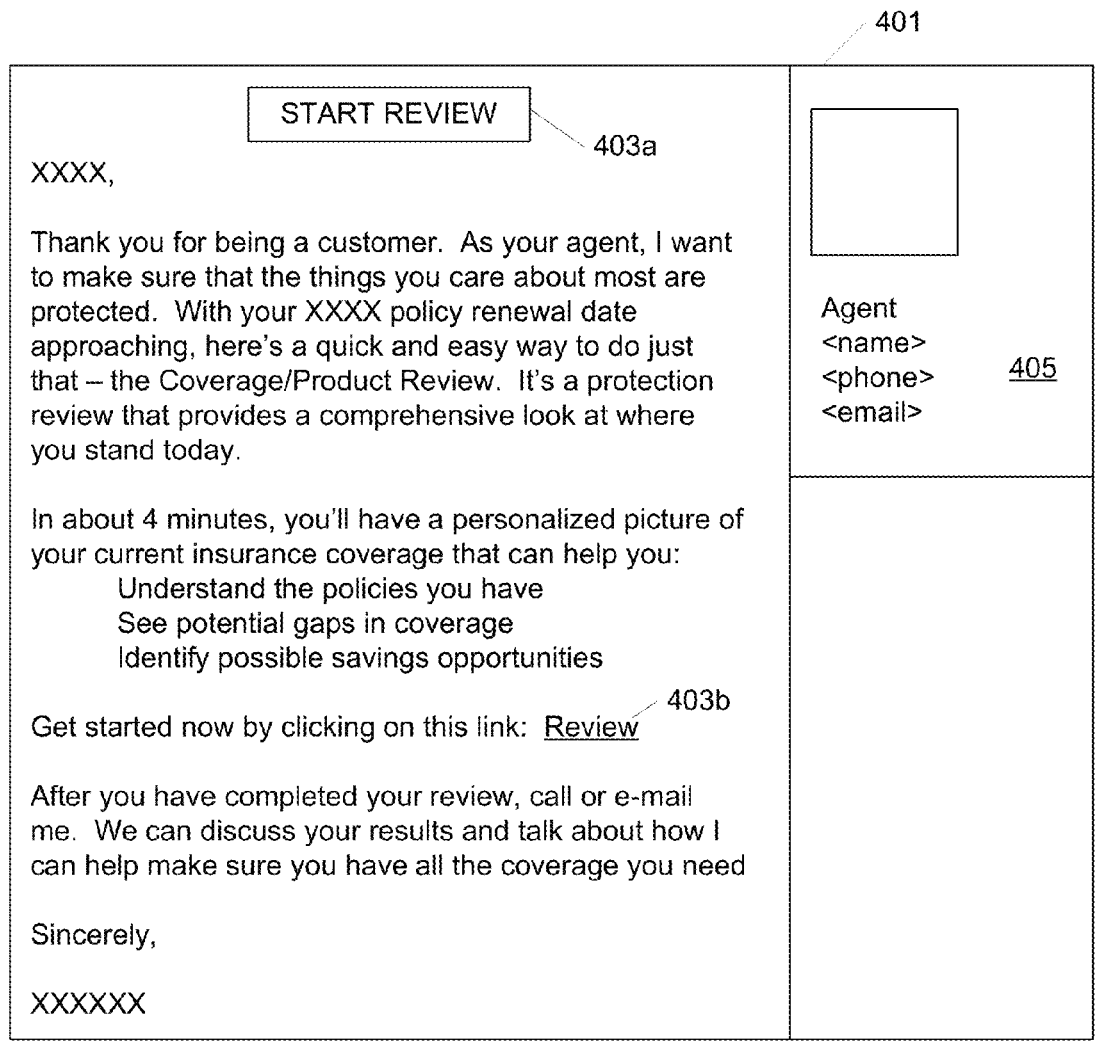
FIG. 4 illustrates an example e-mail message that may be generated and sent to an individual or entity for initiating a financial coverage review according to one or more aspects of the disclosure.

Messages to an entity to initiate a review (e.g., the process of FIG. 3) of the entity's financial coverages and products may take a variety of forms. FIG. 4 illustrates an example e-mail message that may be sent to an individual, inviting them to begin a review of their financial coverage status. The message 401 may include multiple links 403a and 403b for navigating the entity to the questionnaire site. The message 401 may further identify the entity's agent along with the agent's contact information in area 405. In addition or alternatively to links to the questionnaire site, the message 401 may include an application attachment (not shown) allowing the entity to locally execute a questionnaire. The data received through the application, once completed or at specified times or points in the questionnaire, may be transmitted to the reviewing company's system for storage and/or analysis. In some arrangements, the questionnaire may be embedded in the electronic message. The entity may thus complete the questionnaire through the electronic message or an application extension thereof. Furthermore, reminders may be sent if the entity has not begun completing the questionnaire. For example, if an entity has not downloaded the application or navigated to the specified link, the system may detect that the entity has not viewed or initiated completion of the questionnaire.

Figure 5:
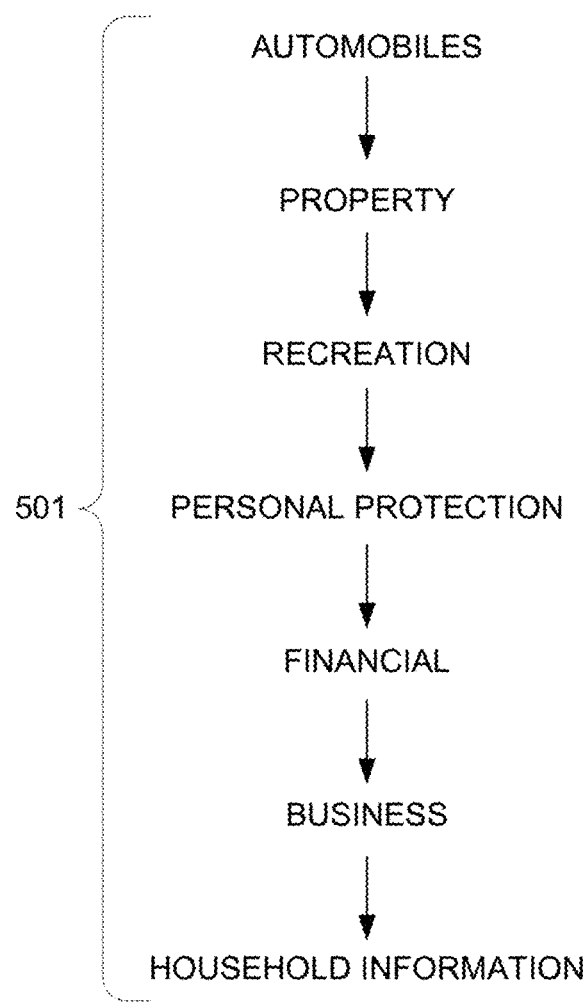
FIG. 5 illustrates an example questionnaire topic flow for obtaining information about an entity's current financial products according to one or more aspects described herein.

FIG. 5 illustrates an example questionnaire topic flow that may be employed for a coverage review. For example, flow 501 may begin with questions about automobiles used by the entity. For example, auto questions may include whether the entity owns or leases a vehicle, a number of vehicles owned or leased, whether each vehicle is insured and whether the entity owns or has purchased roadside assistance coverage. Next, the entity may be directed to questions about property and property insurance including whether the entity owns or rents property and the type of property owned or rented, whether the property is insured (e.g., homeowner's, flood, hurricane, etc.) and the like. The flow 501 may also include questions including other properties (e.g., secondary residences or vacation homes). The entity may next be asked to complete information about recreational vehicles including types, number, ownership/rental and insurance coverage.

Flow 501 may subsequently include questions relating to personal protection including personal umbrella protection, additional valuables coverage, life insurance and identity protection. Financial questions may relate to the existence/sufficiency of retirement plans/funds, college savings, and regular savings. In one or more arrangements, some questions might not be posed depending on answers to previous questions. For example, if an individual indicates that they do not have any children, then a question about college savings may be omitted. In other instances, the question may still be included. In another example, if an entity indicates he or she does not own any recreational vehicles, all of the recreational vehicle questions may be skipped or otherwise omitted from the questionnaire. The flow 501 may further include questions relating to whether the entity owns a business and if so, whether the business is adequately insured. The series of questions may then end with a request for household information including number of adults in household, gender of one or more of the adults, number of children in household, age and gender of one or more of the children and the like. For each of the above financial topics, questions relating to insurance or financial coverage may include optional responses that identify whether an individual's existing policy is provided by a particular provider (e.g., the reviewing provider) or another provider. In some cases, the individual may be asked to identify the provider specifically. Additionally or alternatively, questions may have a pre-populated answer if data was automatically retrieved (e.g., from the provider's database). The individual may have the ability to modify the pre-populated answers as needed or desired. If an answer has been pre-populated, the questionnaire may, in some arrangements, provide an indication of the pre-population (e.g., an icon, the pre-populated answer displayed in another color, style or font, etc.). The above listing of topics may be organized in different sequences and may include additional or alternative questionnaire topics.

Once an individual or other entity has completed the questionnaire, recommendations may be generated and prioritized. Recommended products and/or actions may be defined based on recommendation rules that specify recommendations for particular combinations of existing or non-existing financial coverages. FIG. 6 illustrates an example recommendation matrix defining the recommended products based on the responding entity's financial coverage profile and defines an order or priority in which an entity's financial profile is to be evaluated. For example, in matrix 601, a priority of combinations of financial product coverage/ownership statuses is specified along with a resulting recommendation. The ownership/coverage statuses of each product in matrix 601 are represented by colors. In the illustrative arrangement, blue indicates that the financial product is owned by the entity through a particular provider (e.g., the reviewing company) while green indicates that the financial product is owned by the entity through another provider. White indicates that the entity does not own the financial product.

In one particular example of FIG. 6, the highest priority specified in matrix 601 corresponds to a combination of an entity having an auto insurance policy through the reviewing provider and either not having homeowner's, condo or renter's insurance or having such insurance through another provider. Matrix 601 further defines the resulting recommendation as homeowner's insurance. Accordingly, if the entity's profile matches the conditions of row/priority 1, a homeowner's insurance recommendation would have the highest priority, regardless of the entity's profile also matching any of the other conditions in matrix 601. In another example, if the entity's coverage profile does not match the conditions of row/priority 1, but matches the conditions of row/priority 2, then auto insurance would be designated with the highest recommendation priority. Accordingly, the review and recommendation system may compare an entity's coverage profile to each row in matrix 601 to identify appropriate recommendations and to construct a prioritized recommendation list.

In the example matrix 601, AP may indicate additional products for which the individual or entity does not appear to have a need. For example, an individual may not own or rent a home (e.g., living with parents), in which case the individual might not need homeowners or renters insurance. In another example, an individual might not own an automobile, thus rendering auto insurance likely unnecessary. Row 4, for instance, indicates that if an individual has auto insurance through another company or does not have auto insurance. Row 4 further indicates that the individual does not have home, condo or renters insurance due to an indicated lack of need for such products. As such, the action item for Row 4 may be to recommend auto insurance through the reviewing company rather than to recommend home, condo or renters insurance in addition to or instead of auto insurance.

For some products or coverages, such as those defined in rows/priorities 6-20, the system may first evaluate those products or coverages for lack of coverage in the specified order. Subsequently, those same products or coverages may be evaluated again for coverage with another provider. The recommendations resulting from the second pass (e.g., existing coverage with other provider) may be prioritized lower than recommendations resulting from the first pass (e.g., lack of coverage). In one example, if an individual does not own or has not purchased flood insurance, but owns or has purchased motorcycle insurance through another provider, the resulting recommendations may be prioritized such that flood insurance is ranked higher than motorcycle insurance. The use of recommendation rules and prioritizations allows for an individual or other entity to better appreciate the relative importance of various financial products as it relates to specifically to them. The recommendations are also customized so that unnecessary or irrelevant financial products are not provided to an individual or entity. The priorities may correspond to a level of perceived risk to the entity, where a more highly recommended product indicates a greater financial risk to the entity does not own the product.

Matrix 601 may have fewer, more or different numbers of conditions for each priority or row. Additionally or alternatively, matrix 601 may include additional priorities or products as needed. Furthermore, different recommendations and condition combinations may be used as desired, needed or preferred. In one or more arrangements, matrix 601 may further include conditions relating to the characteristics of the individual or entity. For example, recommendations and recommendation priorities may be defined based on an individual's geographic location, age, gender, number and age of children, marital status and the like. These user or individual characteristics may be used in combination with or independently of the individual's financial coverages to specify the recommendations and priorities thereof.

Figure 7A:
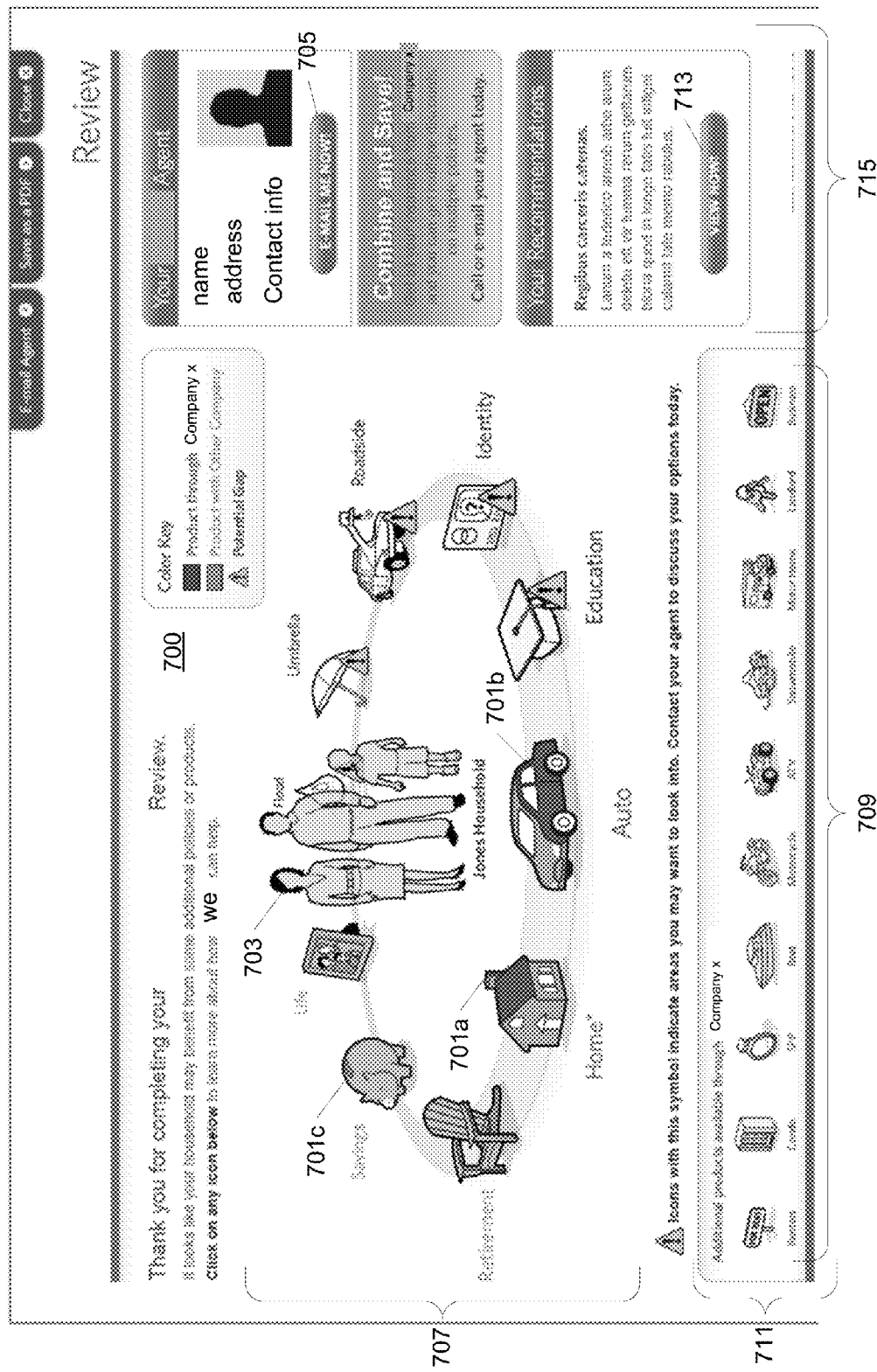
FIG. 7A illustrates an example graphical display providing a summary of an entity's financial coverage profile and one or more recommendations according to one or more aspects described herein.

In addition to recommendations, the recommendation and review system may further provide an individual or entity with a comprehensive summary of their current financial coverages and potential gaps in coverage. FIG. 7A illustrates an example user interface in which an individual's financial coverage profile is visually represented. In interface 700, each available financial product or coverage is represented by one of graphical icons 701. For example, homeowner's insurance is represented by a house icon 701a while auto insurance is represented by a car icon 701b. In another example, retirement may be represented by a piggy bank icon 701c. In still other examples, piggy bank icon 701c may represent savings. The icons (product representations) may be arranged in a circular and three-dimensional arrangement as shown in interface 700. This may allow an individual to view all of the various available financial products simultaneously. Various other arrangements, shapes and views may be defined or selected based on preferences of the user, system settings, viewability, number of products to be displayed and the like.

Additionally or alternatively, a representative image 703 of the individual or entity being reviewed may be displayed in association with the various icons 701. The representative image 703 provides the individual or entity with a sense of connection to the summary presented in interface 700 which may help reinforce the importance of the various financial coverages that have and have not been purchased. In one example, the representative image 703 may include a number of people corresponding to a number of people in a household. The images of the people may further indicate the various ages and genders of the household members to better represent the reviewed household. In a particular example, the image 703 may include a photograph of the individual, family, or other entity.

Each of icons 701 representing a financial product may be displayed with particular visual characteristics depending on an ownership status of the entity relative to the corresponding financial product. For example, the icons 701 may be displayed differently depending on whether the reviewed individual or entity owns the financial product and whether the financial product is owned through a particular provider or from other providers. In a particular example, if a product is owned by the individual through a particular provider (e.g., the reviewing company), the corresponding icon may be displayed in a first color such as blue. If a product is owned by the individual but through another provider (e.g., other than the reviewing company), the corresponding icon may be displayed in a second color such as green. If the individual does not own the product, the corresponding icon may be displayed in a third color such as white. In some arrangements, other visual characteristics may be added or changed for each category of product. For example, an exclamation point with a yellow background may be added to icons corresponding to products that are not owned by the individual. Other visual characteristics (other than or in addition to color) may be used to identify various attributes of the corresponding products. By modifying and particularizing visual attributes of the icons representing the financial products, an individual or entity may more readily determine an overall health of their financial coverage profile and identify potential gaps.

According to some aspects, some financial products, such as those represented by icons 701, may be displayed in a first summary area 707 of interface 700 while other financial products, represented by other icons 709 may be displayed in a second summary area 711. The division between the first and second summary areas 707 and 711 and the displayed products in each may indicate a further level of importance or significance. For example, less important or significant financial products may be displayed in second summary area 711. Additionally, icons 709 and associated text may be displayed smaller or in different colors to further represent the lower importance or significance. The recommendation and review system may determine which products to place in the first summary area 707 and which products to place in the second summary area 711 based on importance or relevance to the reviewed individual or entity. For example, if a family does not own a motorcycle, then motorcycle insurance may be displayed in second summary area 711. On the other hand, if a family does own a motorcycle, an icon representing motorcycle insurance may be displayed in first summary area 707.

Icons 701 displayed in primary summary area 707 may be moved (e.g., rotated) so that an individual may view each icon and product from a preferred perspective. In some arrangements, the movement of the icons 701 also allows icons that might otherwise be obscured (e.g., hidden or transparently obscured by image 703) to be more completely viewable (e.g., no longer obscured). Interactions with icons 701 such as hovering over or selecting the icons 701 may cause additional information about the products to be displayed. For example, specific recommendations relating to levels of coverage for a financial product may be displayed in a pop-up window or pop-up information bubble. In another example, the additional information may include details of a currently owned policy (if owned), the available levels of coverage for that type of product, approximate costs to change the level of coverage or policy, multi-line savings/discounts for purchasing the product and the like may also be displayed. A user may be able to modify coverage hypothetically within the additional information window to see how the changes might affect his or her costs and coverage. By allowing a user to make such modifications within a sub-window within interface 700, the user may view how the potential change would affect his or her coverage profile comprehensively.

In yet another example, the additional information may include a comparison of a currently owned product (e.g., from another company) with an available product through the reviewing provider. This allows the system to notify an individual of the advantages to purchasing the financial product through the reviewing provider rather than from their existing provider. Icons 709 may also be moved in second summary area 711. In some arrangements, they may be moved in conjunction with movement of icons 701. In other arrangements, icons 709 may be moved independently of movement of icons 701.

In some arrangements, the age of a potential gap (e.g., a type of product not owned by the reviewed entity) may be tracked by the review and recommendation system. Accordingly, upon select or otherwise interacting with an icon corresponding to a not-owned product, the age of the gap may be displayed. Alternatively or additionally, the corresponding icon may change color depending on the age of the gap (e.g., how long the entity has been without that type of insurance product). In one particular example, an icon may gradually change from white to black in grayscale, where black represents an age greater than a specified upper threshold and white represents an age less than a specified lower threshold.

Interface 700 further includes a contact information and recommendation area 715. In area 715, the interface may display a recommendation option 713, selection of which allows a user to view the recommended products and/or actions. The recommendations may be pre-generated (e.g., after completion of the questionnaire) or on-the-fly in response to the selection of option 713.

FIG. 8 illustrates an example recommendation page that may be generated and/or presented upon selection of an option such as option 713 of FIG. 7A. The recommendation page 800 may include a list of available products along with a short description for each. Each product description may further include a link to a more detailed product page where a user may further purchase the available product.

Referring again to FIG. 7A, contact and recommendation area 715 of interface 700 may further provide an option 705 to contact an agent to discuss the individual's coverage review. Thus, if an individual is considering filling gaps in their financial coverage profile or switching from another existing provider, the agent information is readily available. This may provide the agent and the company with an opportunity to convince the individual to purchase additional products or to switch from existing providers. Option 705 may provide the individual with multiple contact options including e-mail, telephone, text message, multimedia message, voicemail and the like.

Figure 9:
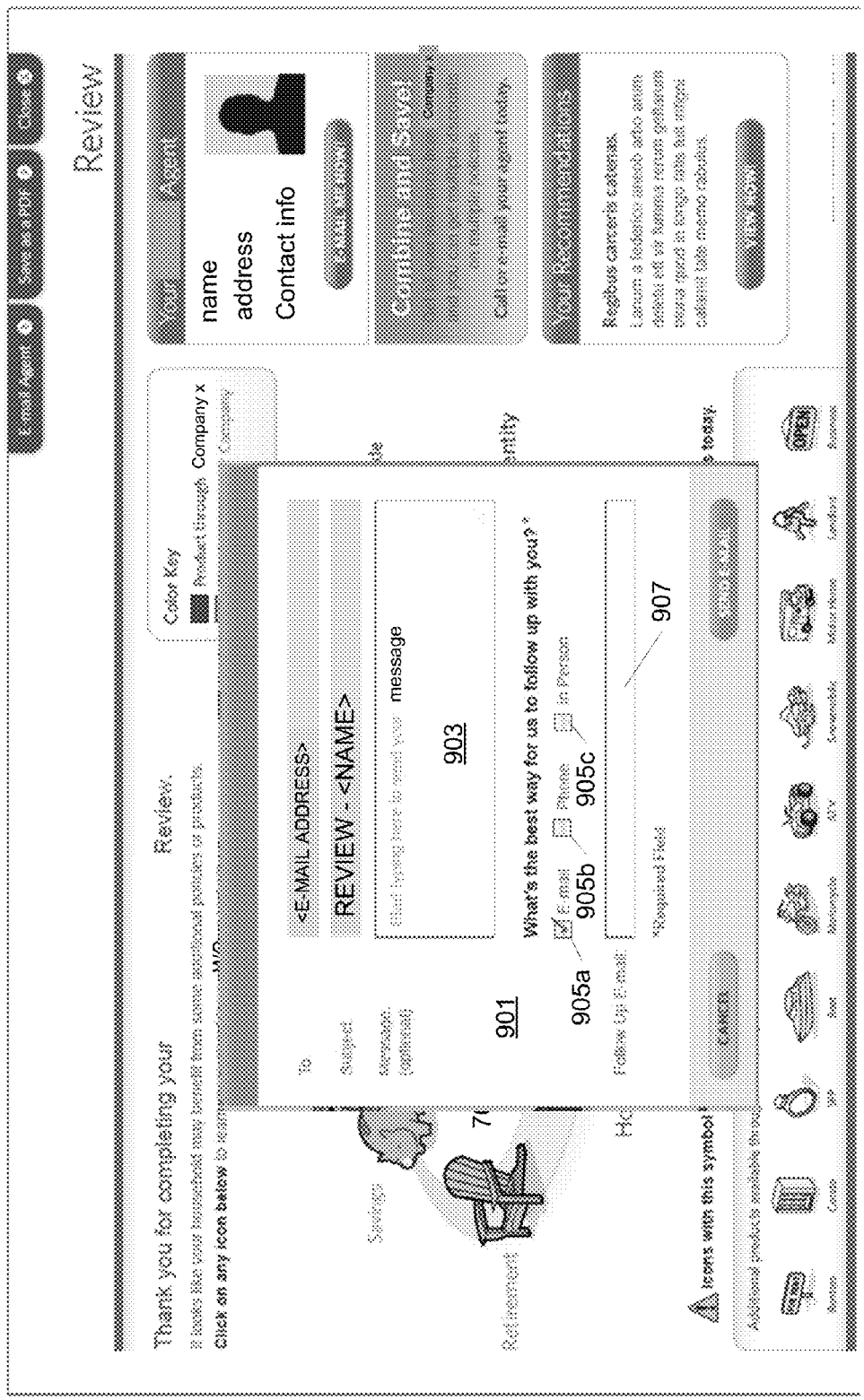
FIG. 9 illustrates an example contact window according to one or more aspects described herein.

FIG. 9 illustrates an example interface in which a pop-up window is generated for contacting an agent. For example, upon selecting option 705 of FIG. 7A, pop-up window 901 may be generated and displayed. Window 901 may include automatically populated fields such as a subject and a recipient address. These fields may also be revised as desired by the individual. Additionally, window 901 may include a message field 903, thereby allowing an individual to customize a message to the agent detailing needs or questions. Contact option boxes 905a, 905b and 905c may be provided to allow the individual to select a most convenient contact method or methods. The individual may then enter the corresponding contact information in section 907.

Figures 7B, 7C:
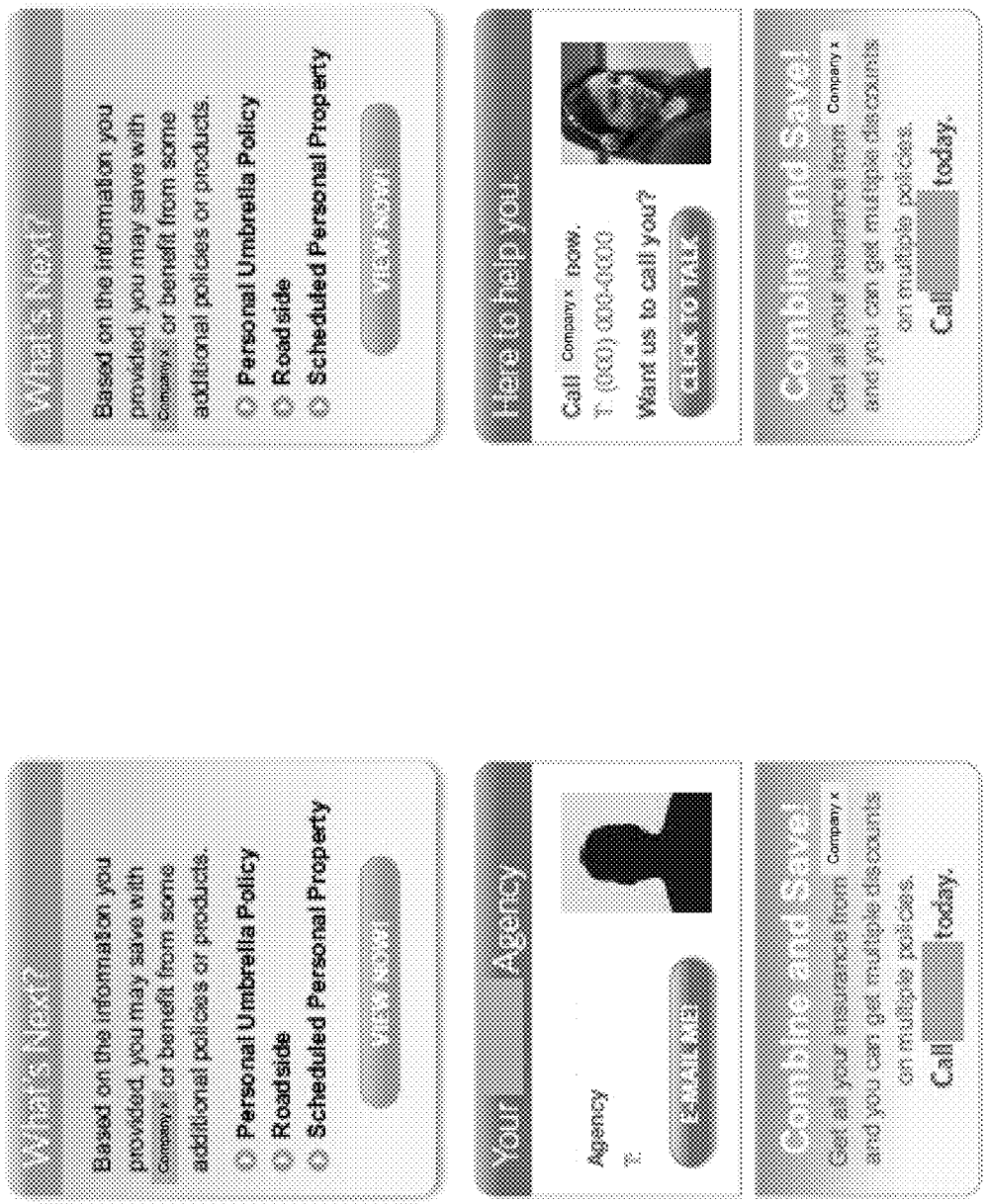
FIGS. 7B-7E illustrate examples of other contact and recommendation interfaces that may be displayed according to one or more aspects described herein.
Figures 7D, 7E:
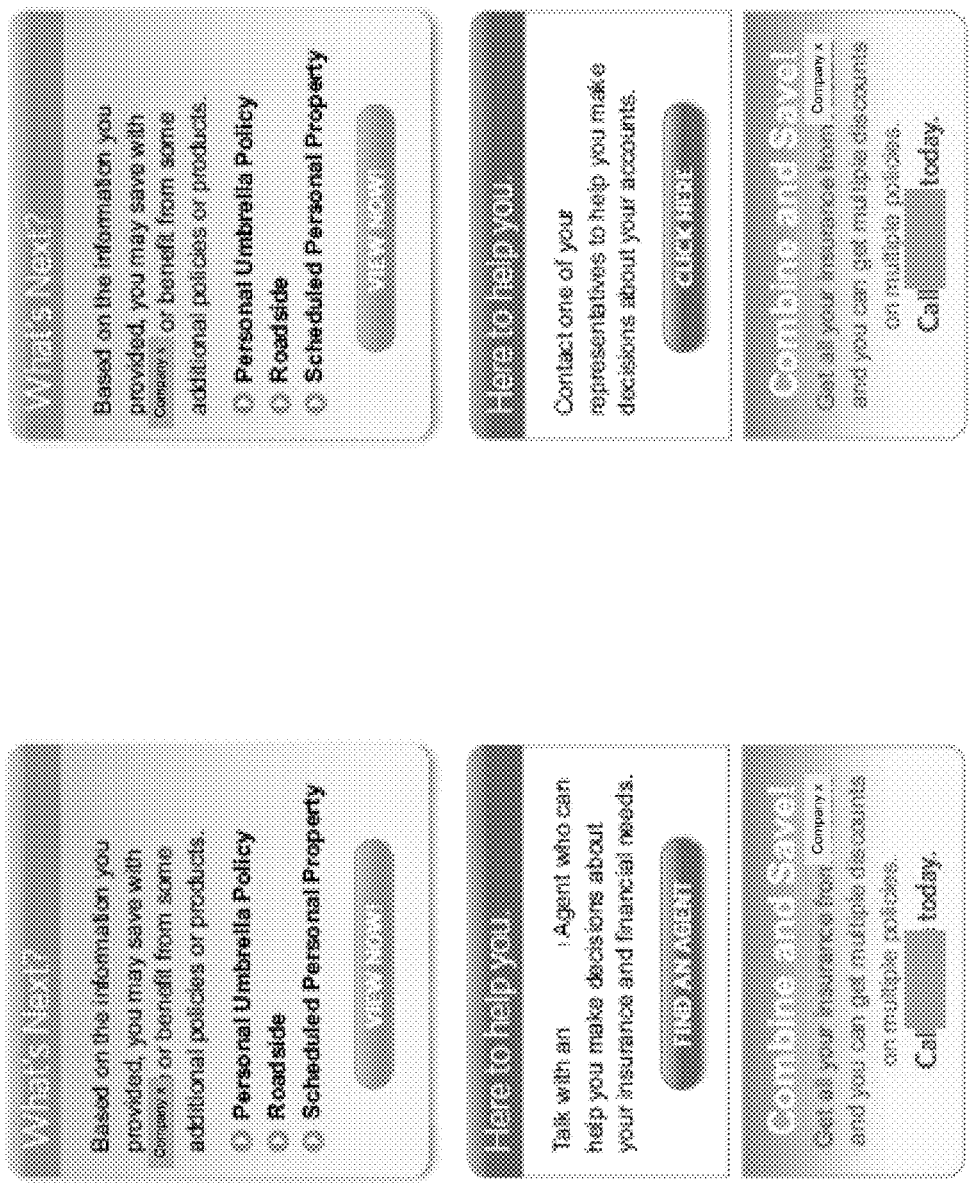

FIGS. 7B-7E illustrate additional or alternative contact and recommendation displays that may be included in interface 700 of FIG. 7A. For example, each of the contact and recommendation displays of FIGS. 7B-7E may replace contact and recommendation area 715 of FIG. 7A. In each of FIGS. 7B-7E, the display may provide a different manner in which to contact the reviewing company (e.g., an insurance provider). In the example of FIG. 7B, the individual or entity being reviewed is invited to contact an agency associated with the reviewing company. In FIG. 7C, on the other hand, the individual or entity is invited to call the reviewing company at a specified number. The display of FIG. 7C may also include an option for the individual or entity to request that a representative of the company call him or her. In FIG. 7D, the interface may provide option to help the individual or entity find an agent to contact. The agent may be a third party individual or entity that is a provider of the reviewing company's financial products. In FIG. 7E, the interface may provide an option to contact a representative of the company associated with the individual or entity and/or their accounts. For example, particular representatives or employees of the company may be assigned to different individuals or entities or regions in which the individual or entities reside.

According to one or more arrangements, the system may further provide a historical view of an entity's financial coverage profile. For example, the system may generate an animation (e.g., multiple graphical displays) of the entity's financial coverage over time. The entity may be allowed to manually review each one (e.g., selecting a next or arrow command to proceed to the following coverage profile) or the system may automatically cycle through the profiles.

Aspects described herein relate to reviewing the existence of financial products within an individual's financial product portfolio and providing recommendations based thereon. In some arrangements and configurations, the coverage level for each product may also be reviewed. Recommendations may thus identify products for which coverage levels may be too high or too low. For example, if an individual with a family of 3 children currently owns a $50,000 life insurance policy, the recommendation system may suggest increasing the life insurance policy to at least $250,000. In another example, a system may recommend changing a roadside assistance coverage level from towing within 2 miles to towing within 10 miles upon determining that the individual commutes over 10 miles to get to work. Alternatively or additionally, cost may be factored into the recommendations. For example, if the same financial product and level of coverage is available through the reviewing company for a lower price, the reviewing company may recommend changing providers for that financial product.

While the aspects described herein have been discussed with respect to specific examples including various modes of carrying out the invention, those skilled in the art will appreciate that there are numerous variations and permutations of the above described systems and techniques that fall within the spirit and scope of the invention.

What is claimed is:

1. A computer-implemented method comprising:
   generating, by a product review and recommendation system having at least one computing device including at least one processor, based on a predefined schedule, an invitation to initiate a financial coverage review for one or more entities, the generating including adding, within the invitation, an electronic network link to a questionnaire location;
   sending the invitation to the one or more entities;
   detecting navigation to the questionnaire location through the electronic network link by an entity of the one or more entities;
   in response to detecting navigation to the questionnaire location by the entity, generating a questionnaire customized to the entity by querying one or more databases to identify existing financial coverages of the entity, the questionnaire including questions regarding the existing financial coverages of the entity;
   receiving one or more responses to the questionnaire from the entity;
   determining a plurality of financial products to recommend to the entity based on the one or more responses to the questionnaire received from the entity; and
   prioritizing, according to a level of financial risk to the entity, the determined plurality of financial products, the prioritizing including:
     assigning a higher priority to a financial product of the determined plurality of financial products having a greater level of financial risk to the entity than another financial product of the determined plurality of financial products, and
     evaluating at least one attribute of at least one financial product of the plurality of financial products, the at least one attribute including one or more of: whether the entity currently owns the at least one financial product of a same type as the at least one financial product and whether the entity currently owns a type of financial product corresponding to the at least one financial product through a first provider associated with the at least one computing device.

2. The computer-implemented method of claim 1, wherein determining a plurality of financial products to recommend includes:
   determining a first attribute of a first financial product, wherein the first attribute includes at least one of: whether the entity currently owns a financial product of the same type as the first financial product and whether the entity currently owns a first type of financial product corresponding to the first financial product through the first provider associated with the at least one computing device;
   determining a second attribute of a second financial product, wherein the second attribute includes at least one of: whether the entity currently owns a financial product of the same type as the second financial product and whether the entity currently owns a second type of financial product corresponding to the first financial product through the first provider associated with the at least one computing device; and
   comparing a combination of the first attribute and the second attribute to one or more recommendation rules.

3. The computer-implemented method of claim 1, wherein sending the invitation further includes generating a letter and causing the letter to be sent through postal mail.

4. The computer-implemented method of claim 1, wherein sending the invitation includes transmitting an electronic message including an application for completing the questionnaire.

5. The computer-implemented method of claim 1, further comprising, prior to receiving the one or more responses to the questionnaire from the entity:
   retrieving financial product information corresponding to the entity from a database,
   wherein generating the questionnaire includes pre-populating at least one response in the questionnaire with the retrieved financial product information.

6. The computer-implemented method of claim 5, further comprising:
   allowing the entity to modify the at least one pre-populated response in the questionnaire.

7. The computer-implemented method of claim 1, further comprising:
   determining that the entity has not completed the questionnaire; and
   saving a progress of the entity in completing the questionnaire, wherein saving the progress includes saving at least one response submitted by the entity.

8. The computer-implemented method of claim 1, further comprising:
   generating a graphical display summarizing a financial coverage profile of the entity, wherein the graphical display includes a plurality of graphical icons representing a plurality of types of financial products; and
   setting at least one characteristic of the plurality of graphical icons depending on an ownership status of the entity for each of the plurality of types of financial products.

9. The computer-implemented method of claim 8, wherein the at least one characteristic is color.

10. The computer-implemented method of claim 9, further comprising:
    adding an image to each of one or more graphical icons, wherein the one or more graphical icons correspond to one or more types of financial products that the entity does not currently own.

11. The computer-implemented method of claim 1, further comprising:
    receiving at least one response to the questionnaire from the entity; and
    omitting at least one question in the questionnaire based on the at least one response.

12. The computer-implemented method of claim 1, further comprising:
    determining that the entity has completed the questionnaire;
    generating a summary of the questionnaire;
    determining that the entity has purchased one of the plurality of financial products; and
    updating the summary of the questionnaire.

13. The computer-implemented method of claim 1, further comprising:
    determining that the entity currently owns a first financial product of the type of financial product, corresponding to the at least one financial product, through a second provider different from the first provider; and
    recommending, to the entity, a second financial product of the type of financial product, corresponding to the at least one financial product, available through the first provider associated with the at least one computing device.

14. The computer-implemented method of claim 1, further comprising:
    determining that the entity has completed the questionnaire; and
    determining whether a predefined condition is satisfied for the entity to receive a discount.

15. The computer-implemented method of claim 1, wherein the prioritizing further includes:
    determining a level of financial risk to the entity for each financial product of the determined plurality of financial products; and
    ranking each product among the determined plurality of financial products based on the determined level of financial risk.

16. One or more non-transitory computer readable media storing computer readable instructions that, when executed, cause an apparatus to:
    generate, based on a predefined schedule, an invitation to initiate a financial coverage review to one or more entities, the generating including adding, within the invitation, an electronic network link to a questionnaire location;
    send the invitation to the one or more entities;
    detect navigation to the questionnaire location through the electronic network link by an entity of the one or more entities;
    in response to detecting navigation to the questionnaire location by the entity, generating a questionnaire customized to the entity by querying one or more databases to identify existing financial coverages of the entity, the questionnaire including questions regarding the existing financial coverages of the entity;
    receive one or more responses to the questionnaire from the entity;

determine a plurality of financial products to recommend to the entity based on the one or more responses to the questionnaire received from the entity; and prioritize, according to a level of financial risk to the entity, the determined plurality of financial products, the prioritizing including:

assigning a higher priority to a financial product of the determined plurality of financial products having a greater level of financial risk to the entity than another financial product of the determined plurality of financial products, and evaluating at least one attribute of at least one financial product of the plurality of financial products, the at least one attribute including one or more of: whether the entity currently owns a financial product of the same type as the at least one financial product and whether the entity currently owns a type of financial product corresponding to the at least one financial product through a first provider.

17. The one or more computer readable media of claim 16, further comprising instructions for:

generating a graphical display summarizing a financial coverage profile of the entity, wherein the graphical display includes a plurality of graphical icons representing a plurality of types of financial products; and setting at least one attribute of the plurality of graphical icons depending on an ownership status of the entity for each of the plurality of types of financial products.

18. The one or more computer readable media of claim 17, wherein generating the graphical display includes:

adding a first set of one or more graphical icons representing one or more of the plurality of types of financial products to a first portion of the graphical display; and adding a second set of one or more graphical icons representing one or more other types of financial products to a second portion of the graphical display, wherein the first set of one or more graphical icons are added to the first portion and the second set of one or more graphical icons are added to the second portion based on a respective importance of corresponding types of financial products to the entity.

19. The one or more computer readable media of claim 16, further comprising instructions for:

wherein prioritizing the determined plurality of financial products includes selecting a set of prioritization rules from a plurality of sets of prioritization rules based on at least one attribute of the entity.

20. An apparatus comprising:

at least one processor; and memory storing instructions that, when executed by the at least one processor, cause the apparatus to:

generate, based on a predefined schedule, an invitation to initiate a financial coverage review, the generating the invitation including adding, to the invitation, an electronic network link to a questionnaire location;

send the invitation to the one or more entities;

detect navigation to the questionnaire location through the electronic network link by an entity of the one or more entities;

in response to detecting navigation to the questionnaire location by the entity, generate a questionnaire customized to the entity by querying one or more databases to identify existing financial coverages of the entity, the questionnaire including questions regarding the existing financial coverages of the entity;

receive one or more responses to the questionnaire from an entity;

determine a plurality of financial products to recommend to the entity based on the one or more responses to the questionnaire received from the entity; and prioritize, according to a level of financial risk to the entity, the determined plurality of financial products, the prioritizing including:

assigning a higher priority to a financial product of the determined plurality of financial products having a greater financial risk to the entity than another financial product of the determined plurality of financial products, and evaluating at least one attribute of at least one financial product of the plurality of financial products, the at least one attribute including one or more of: whether the entity currently owns a financial product of the same type as the at least one financial product and whether the entity currently owns the financial product of the same type as the at least one financial product through a provider.

* * * * *